UNITED STATES PATENT OFFICE.

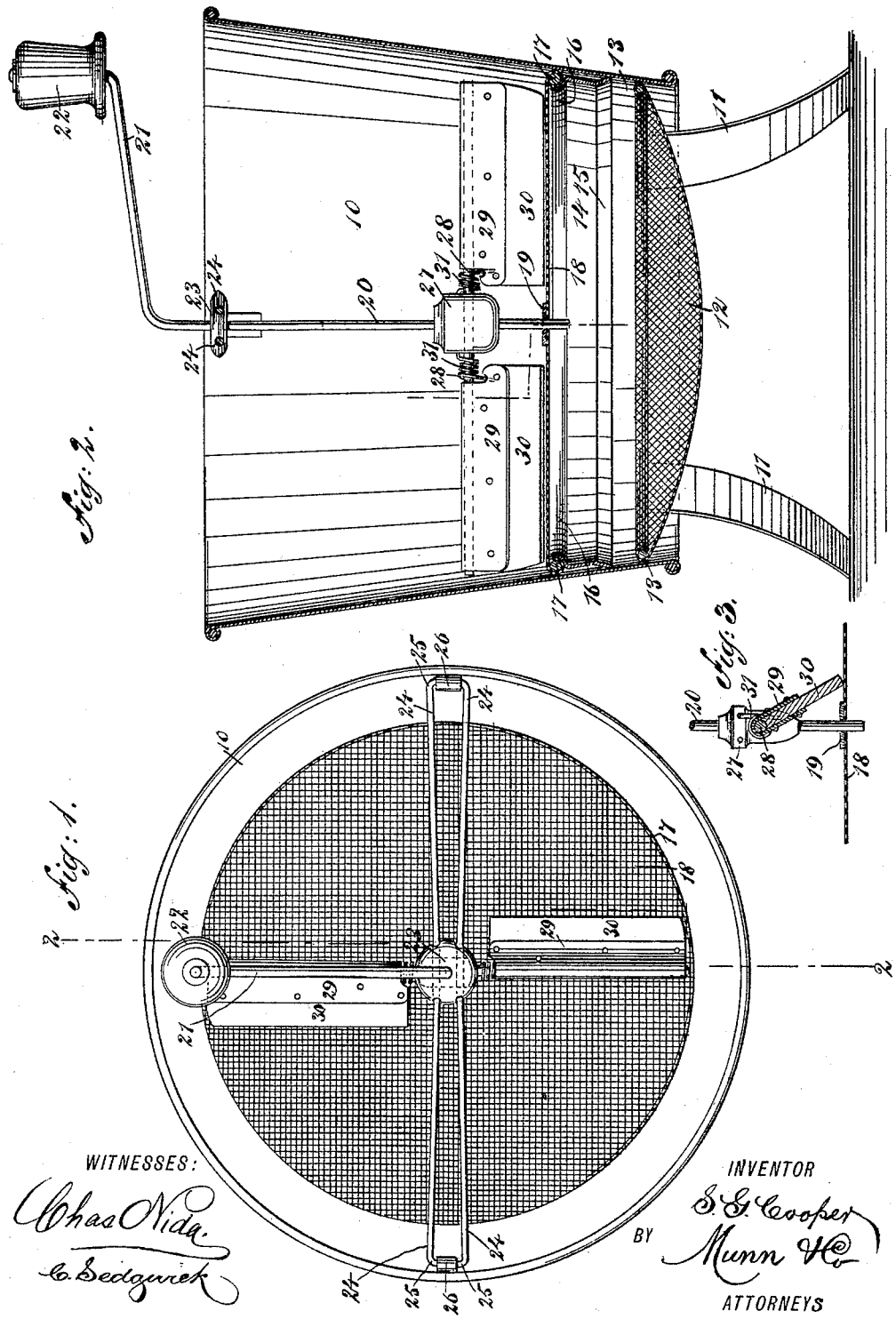

SILAS G. COOPER, OF MINNEAPOLIS, MINNESOTA.

SIEVE.

SPECIFICATION forming part of Letters Patent No. 462,111, dated October 27, 1891.

Application filed May 27, 1891. Serial No. 394,261. (No model.)

*To all whom it may concern:*

Be it known that I, SILAS G. COOPER, of Minneapolis, in the county of Hennepin and State of Minnesota, have invented a new and Improved Sieve, of which the following is a full, clear, and exact description.

My invention relates to improvements in sieves or strainers; and the object of my invention is to produce a sieve of simple construction which may be used for sifting a great variety of articles, but which is especially adapted for use as a fruit sieve or strainer in preparing fruits for making jellies, marmalades, &c.

To this end my invention consists in certain features of construction and combinations of parts, which will be hereinafter fully described and claimed.

Reference is to be had to the accompanying drawings, forming a part of this specification, in which similar figures of reference indicate corresponding parts in all the views.

Figure 1 is a plan view of the device embodying my invention. Fig. 2 is a vertical cross-section of the same on the line 2 2 in Fig. 1, and Fig. 3 is a broken detail view showing the manner in which the paddles are secured to the main crank-shaft.

The sieve is provided with a body 10, which is open at the top and bottom, and which tapers slightly toward the bottom, the body being supported upon suitable legs 11, which are attached to its lower portion. In the extreme lower portion of the body is a removable ring 13, which fits closely therein and which is prevented from dropping out by the converging sides of the body, and this ring supports a strainer 12, which is adapted to hang down slightly in the center, as best shown in Fig. 2. Above the strainer is a circular band 14, which also fits within the body, and which is provided at its lower end with an outwardly-bent flange 15, which flange engages the sides of the body 10 and holds the band in place. The upper edge of the band 14 is bent inward, as shown at 16, and forms a support for a ring 17, and over this ring is stretched a wire-netting 18, although the sieve thus formed may be of other material, if desired.
The sieve 18 is provided with a perforated washer 19, which is secured to it at the center, and extending downward through this washer is a revoluble rod 20, the upper end 21 of which extends above the top of the body 10 and is bent laterally to form a crank, and this crank terminates in a handle 22. The upper portion of the rod 20 is held to turn in a collar 23, which collar is centrally supported on the spring cross-bars 24, which cross-bars extend across the top portion of the body and are secured at their outer ends in keepers 26, the outer ends of the bars 24 being bent laterally, as shown at 25, so that they will enter the keepers, and the spring of the metal composing the bars will serve to hold them in place. Near the lower portion of the rod 20 and a little above the sieve 18 is a collar 27, which is fixed to the rod, and extending laterally from this collar are arms 28, which are firmly secured thereto and which support clamping-pieces 29, the said pieces being doubled over the arms, and wooden paddles 30 are secured between the clamping-pieces. These paddles are not necessarily made of wood; but it is better that they be made of this material, as they are intended to contact with the sieve 18, and if made of wood they will not wear it out quickly. The paddles 30 are inclined oppositely, as shown in Fig. 1, so that when revolved they will be drawn in one direction over the sieve 18, and they are normally pressed downward upon the sieve by means of coiled springs 31, which are wound around the inner ends of the arms 28, the springs having their inner ends secured to the collar 27 and their outer ends attached to the paddles. It will thus be seen that the paddles will constantly press downward upon the sieve.

When the device is to be used, the fruit to be strained is placed in the body 10 and the paddles are revolved by means of the crank 21 and handle 22, and as they revolve they will crush the fruit and force it through the sieve 18 upon the strainer 12, and the juice will drip from this strainer into any receptacle which may be prepared to receive it. The sieve 18 may be either fine or coarse, according to the use to which the strained fruit is to be put, and while the device is especially adapted for preparing fruit it may be also used for sifting or straining other articles.

Having thus described my invention, I claim as new and desire to secure by Letters Patent—

1. A sieve comprising an open-ended tapering body 10, a removable strainer inserted downward into the lower smaller end of the body, a removable sieve above the strainer and inserted downward into the body, a removable vertical shaft mounted in bearings in the body, extending down through said sieve and provided with blades or paddles working on the upper face of the sieve, substantially as set forth.

2. A sieve comprising the open-ended body, a stationary sieve 18, and a stationary strainer 12 in the lower end of the body, a removable vertical shaft 20, mounted at its lower end in a bearing in the sieve and provided with spring-pressed paddles or blades, and a removable transverse cross-piece having a bearing in which the upper part of the shaft is journaled, substantially as set forth.

3. The combination, with the body having a sieve and keepers in its upper end at opposite sides, of spring cross-bars having their ends bent to enter the keepers, a central bearing on the cross-bars, and a vertical shaft extending down through the bearing and provided at its lower end with spring-pressed paddles, substantially as set forth.

4. In a device of the character described, the combination of a body having keepers on opposite sides near the top, spring cross-bars having a collar centrally thereon and having bent ends to enter the keepers, and a crank-rod held to turn in the collar, substantially as described.

SILAS G. COOPER.

Witnesses:
N. L. COOPER,
JOHN MEETHE.